E. BACHER & W. McKINNIS.
Device for Tempering Butter.
No. 219,137.  Patented Sept. 2, 1879.
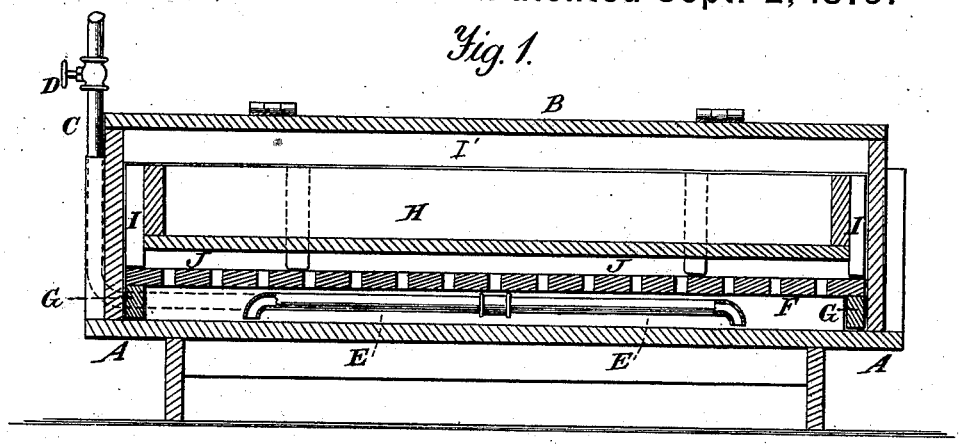
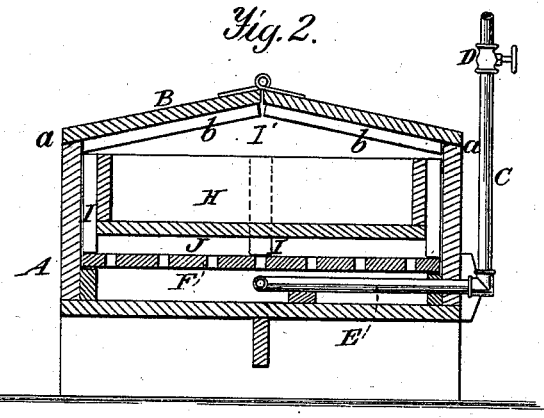
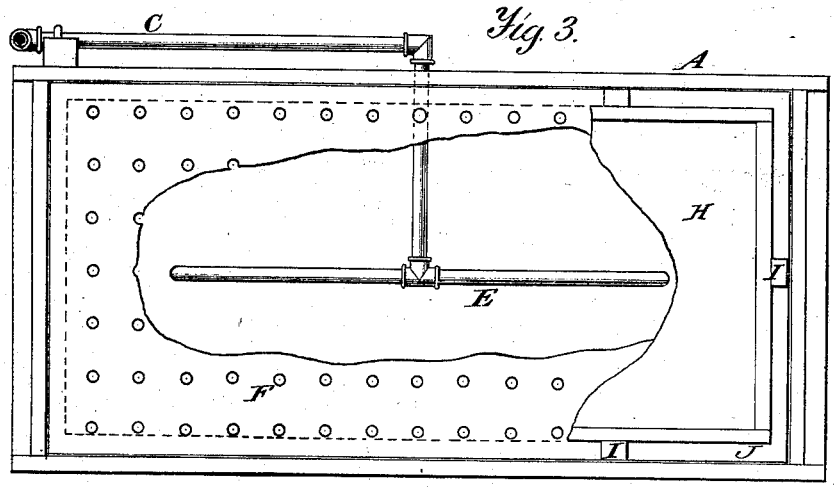

UNITED STATES PATENT OFFICE.

ERNEST BACHER AND WILLIAM McKINNIS, OF FINDLAY, OHIO.

IMPROVEMENT IN DEVICES FOR TEMPERING BUTTER.

Specification forming part of Letters Patent No. 219,137, dated September 2, 1879; application filed September 12, 1878.

*To all whom it may concern:*

Be it known that we, ERNEST BACHER and WILLIAM MCKINNIS, of Findlay, in the county of Hancock and State of Ohio, have invented certain new and useful Improvements in Devices for Tempering Butter; and do hereby declare that the following is a full, clear, and exact description of the same, reference being had to the accompanying drawings, forming a part of this specification, in which—

Figure 1 is a vertical longitudinal sectional view of a device embodying the improvements in our invention. Fig. 2 is a vertical transverse sectional view; and Fig. 3 is a sectional plan view, with the cover of the outer tank or box removed.

The invention has relation to devices for tempering butter; and it consists in the improvements in the construction of the same, hereinafter fully set forth, and particularly pointed out in the claim.

In the accompanying drawings similar letters of reference indicate corresponding parts in the several figures.

This invention grows out of the necessity for some means of softening store collections of butter, so that the butter may be tempered for the purpose of commingling or ladle-working, in order to bring it to a uniform color or grade.

In winter the butter, as brought to market, is in hard rolls or kits, and no two rolls or kits are of the same color or grade.

The object of softening or tempering these rolls or kits is that they may be commingled or blended and ladle-worked into a homogeneous body or mass, both in respect to color and grade, without injury to the grain or body of the butter, thus greatly enhancing the marketable value of the same and lessening the labor of packing.

Referring to the drawings, A indicates a tank, trough, or box, having inclined top edges at its ends *a a*, as shown, and provided with a removable cover, B, formed in two parts, hinged together, as shown. Said cover is provided with cleats *b b* near each end to hold it in place upon the box.

A steam-pipe, C, provided with a stop-cock, D, near its top, enters the box A near its bottom, at one side, about centrally of the box A, and connects with a pipe, E, equal in length to about one-half of the length of the box. The said pipe has downward-projecting open ends, which direct the steam against the bottom of said box A, and cause it to spread within and distribute itself throughout the same.

A perforated partition, F, provided with cleats G at its ends, upon its under surface, is placed within the box A and rests above the steam-pipe E.

A second box, H, having no cover, is provided with legs I upon its outside, extending from its upper edge to a short distance below its bottom. These legs I rest upon the perforated partition F and against the inner sides and ends of the box A, and cause a space, J, to be formed around the box H, which communicates with a space, I', above the box H, permitting the steam to circulate entirely around said box H and into the same and in contact with its contents.

The operation of the invention is extremely simple. The butter to be tempered is placed in the box H, and steam is admitted through the pipes C E until the temperature in the box A has attained a proper degree to temper the butter, which can be easily maintained and regulated uniformly throughout the operation.

In some cases it is desirable to use water in conjunction with the steam. In such instances the box A is filled with water until the steam-pipes C and E are covered and the water has risen nearly to the perforated partition F, after which the steam is admitted through said pipes, and its admission is regulated and controlled as before mentioned.

The heat thus applied to the interior of the box A entirely surrounds the box H and its contents, the steam passing under, around, and over said box, and coming in direct contact with the butter contained therein, thus heating it to the proper temperature to be manipulated, commingled, and mixed to a uniform grade or color; and a further advantage is secured, as the butter may be maintained at a suitable temperature for packing (after being tempered) during the packing operation or any time intervening between the tempering and packing, which is very important in cold weather.

We claim—

In an apparatus for tempering butter, the combination of the outer box, A, steam-pipes C and E, perforated partition F, and inner box, H, the latter being supported by legs I upon the perforated partition, whereby a steam-space is formed entirely around said box H, substantially as and for the purposes specified.

In testimony that we claim the foregoing improvements as above described we have hereunto set our hands and seals this 10th day of December, 1878.

ERNEST BACHER. [L. S.]
WM. McKINNIS. [L. S.]

Witnesses:
D. B. BEMESLEY,
THEO. MUNGEN.